United States Patent [19]

Mayer et al.

[11] 4,404,590
[45] Sep. 13, 1983

[54] VIDEO BLINK COMPARATOR

[75] Inventors: Ben Mayer, Los Angeles, Calif.; Catherine A. Phillips, Manset, Me.

[73] Assignee: The Jackson Laboratory, Bar Harbor, Me.

[21] Appl. No.: 290,569

[22] Filed: Aug. 6, 1981

[51] Int. Cl.³ .............................................. H04N 7/18
[52] U.S. Cl. ..................................... 358/106; 356/398
[58] Field of Search ................. 358/106, 107, 93, 101; 356/392, 393, 397, 398; 350/30

[56] References Cited

U.S. PATENT DOCUMENTS

| | | | |
|---|---|---|---|
| 3,712,740 | 1/1973 | Hennings | 356/393 |
| 3,713,720 | 1/1973 | Craig | 350/30 |
| 3,735,036 | 5/1973 | Macovski | 358/106 |
| 3,744,917 | 7/1973 | Craig | 350/30 |
| 3,854,822 | 12/1974 | Altman | 356/398 |
| 3,894,797 | 7/1975 | Barowski | 353/30 |
| 4,005,939 | 2/1977 | Stavalone | 350/30 |
| 4,007,326 | 2/1977 | Bernsen | 358/106 |
| 4,153,897 | 5/1979 | Yasuda | 340/146.3 Q |
| 4,244,029 | 1/1981 | Hogan | 364/728 |
| 4,254,400 | 3/1981 | Yoda | 340/146.3 MA |

FOREIGN PATENT DOCUMENTS 2830846  1/1979  Fed. Rep. of Germany ...... 356/398

OTHER PUBLICATIONS

Gaertner, Spec. Sheet 5-71-1, "The Gaertner ABC Blink Comparator", Oct. 1971.

Primary Examiner—Howard Britton
Attorney, Agent, or Firm—Daniel H. Kane, Jr.

[57] ABSTRACT

A video blink comparator incorporates an optical system for presenting and superimposing a data pattern image and reference pattern image, a video system for generating a video signal for final comparison of the reference image and data image, and a control system for blinking the respective data image and reference image on and off at the same frequency and out of phase so that a video picture formed by the video signal remains constant when the data image and reference image patterns are substantially identical and so that variant elements of the respective patterns blink on and off in the video picture. A lens system is provided spaced from a video camera to provide variable magnification or enlargement of the superimposed pattern images. Universal mounting of components permits sequential scanning of the superimposed image in fractional portions or blocks permitting non-linear distortion introduced during pattern formation. The control system permits variation of a number of blink comparison parameters affording flexibility in its use and application.

64 Claims, 13 Drawing Figures

VIDEO BLINK COMPARATOR

The invention described herein was made in part in the course of work under a grant or award from the Department of Health and Human Services.

FIELD OF THE INVENTION

This invention relates to a new and improved blink comparator for comparing a complex data pattern such as a spot pattern or pattern of other elements with a corresponding reference pattern. The video system according to the present invention permits improved analysis and flexibility for blink comparison. The invention has broad application for data analysis from protein identification, other biomedical applications and research in physics and astronomy, to aerial surveillance, topographic and cartographic surveying, and quality control of articles involving complex patterns.

BACKGROUND OF THE INVENTION

The principle of blink comparison is well known in the field of astronomy, and optical blink comparators are used to identify anomalous astronomical events. A picture of the sky or portion of the sky at an earlier reference time provides a reference image. Astronomical comparisons are made of the same portions of the sky at a later time for discovering the subsequent occurrence of novae or other celestial events not present in the reference image. According to one prior art method the reference image is placed under one eyepiece of a binocular microscope with the comparison image or data image from a later time under the other microscope eyepiece. The separate patterns before each eye are aligned by stereo vision. The two images superimposed by the eyes of the viewer are alternately illuminated and a variant spot will appear to "blink" and is therefore immediately identifiable. Objects or spots coinciding in both images appear continuously to the viewer.

This stereo comparator requires exact mechanical/optical alignment and is very fatiguing on the eyes of the operator. The operator must also have stereo binocular vision. Such microscope blink comparators therefore are particularly subject to human error. An example of such a microscope optical comparison device is found in U.S. Pat. No. 3,713,720 in which differences between the standard and the object being compared appear as pulsations or flicker in the fused superimposed image. Another example of an optical comparison device is found in U.S. Pat. No. 3,744,917.

The blinking, pulsating or flicker comparison principle has been applied also in projection systems for astronomical application. The projector blink comparator works on the basic "blink" principle, but transparencies are first formed of the reference image and unknown test image or data image for overlapping projection on a screen. The arrays of spots or other elements of the reference transparency and the data transparency are projected alternately onto the screen with careful alignment. The occurrence of unknown or variant spots or elements in one of the respective patterns is identified by the blinking effect in the field of view of the screen. Such a procedure avoids the eye fatigue and strain of the microscope viewer blink comparator but creates difficult optical alignment problems. Furthermore such a projector system is not suitable for other applications in the biomedical field such as protein identification where the spot patterns undergo non-linear distortion during preparation. Thus, the projector blink comparator cannot compensate for varing non-linear distortion across the reference pattern or data pattern causing unintended and undesired differences and variations often encountered in applications in the biomedical field.

One example of a projector blink comparator is available from Ben Mayer, Envel Designs, 1940 Cotner Avenue, Los Angeles, Calif. 90025. Related prior art information may be found in U.S. Pat. No. 4,005,939 and U.S. Pat. No. 3,894,797. A blink comparator designed for astronomers in which the aligned images are presented on a rear projection screen is available from Gaertner Scientific Company, 1201 Wrightwood Avenue, Chicago, Ill. 60614, Model No. M1414.

For applications in the biomedical field such as identifying proteins of an unknown serum, proteins of a known serum and of the unknown serum are each distributed as spots in a separate pattern or array by chromotography and electrophoresis methods such as two dimensional electrophoresis and isoelectric focusing. Such methods introduce non-linear effects and distributions into the pattern or array of proteins which otherwise provide a "fingerprint" pattern of for example as many as five hundred spots used for identifying the unknown serum by characteristic proteins. A disadvantage of the optical and projection type comparators heretofore developed is that because of the non-linearity of the distortions introduced it is not possible to compensate for the distortions over the entire field of view of the optical or projector system for performing the blink comparison.

The complex data handling required for compensation of distortion during comparison has heretofore required complex digital data processing systems such as for example the image data processor described in U.S. Pat. No. 4,254,400; the digital video correlator described in U.S. Pat. No. 4,244,029; and the device for comparing standard and unknown patterns found in the U.S. Pat. No. 4,153,897.

These patents generally describe image or pattern data processors using large computers. For example in U.S. Pat. No. 4,244,029 a reference image and a live image are digitized and the digital signals are compared against each other using digital computer methods. Thus, all three of these references rely on complex computer programs for analysis of data in digital form in order to make the comparison. None of the three references for image processing use the blink comparator principle.

OBJECTS OF THE INVENTION

It is therefore an object of the present invention to provide a blink comparator system for comparing a complex data pattern with a reference pattern which presents the comparison images visually to the viewer or operator for immediate recognition of variant spots or pattern elements without expensive digital data processing.

Another object of the invention is to provide a blink comparator system which visually presents the comparison data without the visual stress and fatigue to the viewer or operator characteristic of optical comparison systems and without the difficulties of alignment encountered in projection systems.

A further object of the invention is to provide a blink comparator system with a range of flexibility in comparison analysis capable of compensating for non-linear distortion of the respective patterns under comparison, and with flexibility in presentation of the images with respect to contrast, intensity, density, etc.

SUMMARY OF THE INVENTION

In order to accomplish these results the present invention contemplates providing a hybrid system including an optical system for presenting and superimposing the data image and reference image, and a video system for effecting the final comparison of the reference image and the data image. Variations between the reference pattern of spots or other elements and the test pattern are immediately identified by the blinking effect on the video screen.

An advantage of the video blink comparator system of the present invention is that the comparison and identification of variant elements can be effected on the video screen without requiring a large computer to correlate digital data and without requiring diagrams manually prepared in advance for input to the computer. Furthermore the video blink comparator eliminates the physiological stresses on the viewer produced by the stereotype optical blink comparison system and the difficulties of alignment encountered in the projection systems. Moreover the video system can be adjusted as hereafter described to compensate for distortion introduced by the methods of preparation of the pattern or array of spots or other elements. Thus, the video blink comparator system of the present invention enjoys a double advantage, that is the simplicity of analog optical or visual data presentation with the flexibility of digital data processing in the ability to compensate for distortion. Such compensation is effected by local alignment of the compared images and not by transformation of the coordinate system of either of the images.

According to the invention the data pattern or test pattern is presented on a first image carrier with a first light source and lens arrangement for establishing a data image light path. The reference image is presented in a second image carrier with a second light source and second lens arrangement for establishing a reference image light path. Further optics superimpose the data image light path and reference image light path, and an image forming lens in the coincident light paths focuses the data image and reference image in a common focal plane spaced from the image forming lens. A video camera flexibly mounted for translation along three dimensions or axes is positioned with the scanning surface of the video camera in the focal plane for scanning at least a selected portion of the image field of the superimposed data image and reference image. A video signal is thereby generated which may be monitored on a video screen or other viewer and also recorded.

The invention provides a blink control for independently controlling the respective first and second light sources for intermittent operation of the light sources at the same selected blink frequency but out of phase so that when the data image is illuminated the reference image is out and while the reference image is illuminated the data image is out. The superimposed images viewed on a television screen give a continuous appearance when the patterns coincide while variant portions blink, pulsate, or flicker at the blink frequency. The image carriers are generally mounted so that at least one of the carriers may be translated along axes perpendicular to the light path while one of the carriers is also mounted for rotation. These degrees of freedom of motion permit accurate alignment and superimposition of the respective data image and reference image in the focal plane of the image forming lens.

The video camera and image forming lens are spaced from each other at a desired distance by an extension tube or element. By varying the spacing between the image forming lens and the video camera surface and by varying the focus of the image forming lens the magnification or enlarging effect on the superimposed images may be varied. By this expedient the video camera may be positioned and the image magnification selected so that the camera scans only a fractional portion or sector of the image field of the superimposed images. The video camera is further provided with a scan motor for translating the video camera surface in the focal plane of the image forming lens. A scan motor control sequentially positions the video camera for piecewise scanning of fractional portions of the image field of the superimposed data and reference images in sequential segments, sectors or blocks.

By selectively varying the magnification of the image and by segmented scanning of the image field non-linear distortions of the data pattern or reference pattern may be locally compensated by alignment of local sectors or portions of the respective images at the same time disregarding consequent non-alignment of other portions of the images.

Thus the present invention permits the image field of the superimposed data image and reference image to be subdivided by the video camera into a plurality of image sectors or segments over a range of fractional divisions. The image subdivisions, segments or sectors can be sufficiently small to effectively eliminate locally any variant distortion between the reference and data images so that the similar data spots or elements in the local segment can be made to coincide.

The invention contemplates that the test pattern or data pattern and reference pattern are prepared on transparencies and mounted in the image presentation module of the video blink comparator. Each transparency is illuminated by a separate light source with condensor or collimating lens for establishing light paths to the remaining optics. The respective reference and data light paths are deflected by first surface mirrors onto a beamsplitter where the light paths are superimposed. The imaging lens forms superimposed images in a common focal plan where the scanning surface of the video camera is positioned.

The control module of the invention permits considerable flexibility in the handling of comparison data including independent variation of the intensity or image density, reversal of the video image between positive and negative, and variation of the blink frequency. Several analysis modes are also possible including blink and constant mode control causing one light source to blink on and off while maintaining the other continuously on; run mode control for blinking both the data image and reference light sources on and off at the same frequency but out of phase; stop mode control for stopping one of the light sources in the on state; and a mode for maintaining one light source continually on while the other is continuously off. The different modes and methods for operating the blink comparator permit identification of the image in which a variant spot or element is located once it is established by blinking that there is an occurrence of such variant spots or elements.

According to another aspect of the invention a coordinate grid reticle is interposed in the coincident light path of the superimposed data image and reference image. The grid pattern is therefore also superimposed across substantially the entire image field of the superimposed images at the focal plane of the image forming lens. The method of the invention also contemplates sequentially scanning different fractional portions or local sectors of the image field by reference to the coordinates of said grid pattern. Furthermore, distances across the image field may be measured by reference to the coordinates of the grid pattern.

Generally according to the method the present invention contemplates illuminating and projecting an image of the data pattern, illuminating and projecting an image of the reference pattern, superimposing the respective images, and focusing the superimposed images in a common focal plane. After aligning the images, the invention provides video scanning of at least a local sector of the image field in the common focal plane, and generating a video signal for viewing or storage while alternately blinking on and off the respective data image and reference image with complementary but out of phase duty cycles. A video picture formed by the video signal on a video monitor, video screen, or other video presentation remains constant when the data image and reference image are substantially identical and variant portions of the respective patterns blink on and off in a video picture formed by the video signal.

The invention lends itself to a wide variety of applications including protein and serum identification from electrophetograms, DNA replicate plating comparisons, and similar applications in the biomedical field including one and two dimensional spectroscopic and chromatographic analysis; aerial surveillance and surveying, and comparison of cartographic and topographic features; holographic and photographic pattern analysis; quality control of integrated circuit chips and similar manufactured items having complex repeated patterns; astronomical research etc.

In these applications the video blink comparator of the present invention permits increased flexibility in the manipulation of the images for equalizing intensity or density, image magnification, compensation for distortion, switching between positive and negative image presentation modes for enhanced field/background discrimination and overall increasing the sensitivity of the blink comparison.

Other objects, features and advantages of the present invention will become apparent in the following specification and accompanying drawings.

BRIEF DESCRIPTION OF THE DRAWINGS

FIG. 9 is a schematic diagram of the control circuit, while

DESCRIPTION OF THE PREFERRED EXAMPLE EMBODIMENTS AND BEST MODE OF THE INVENTION

Figure 1:
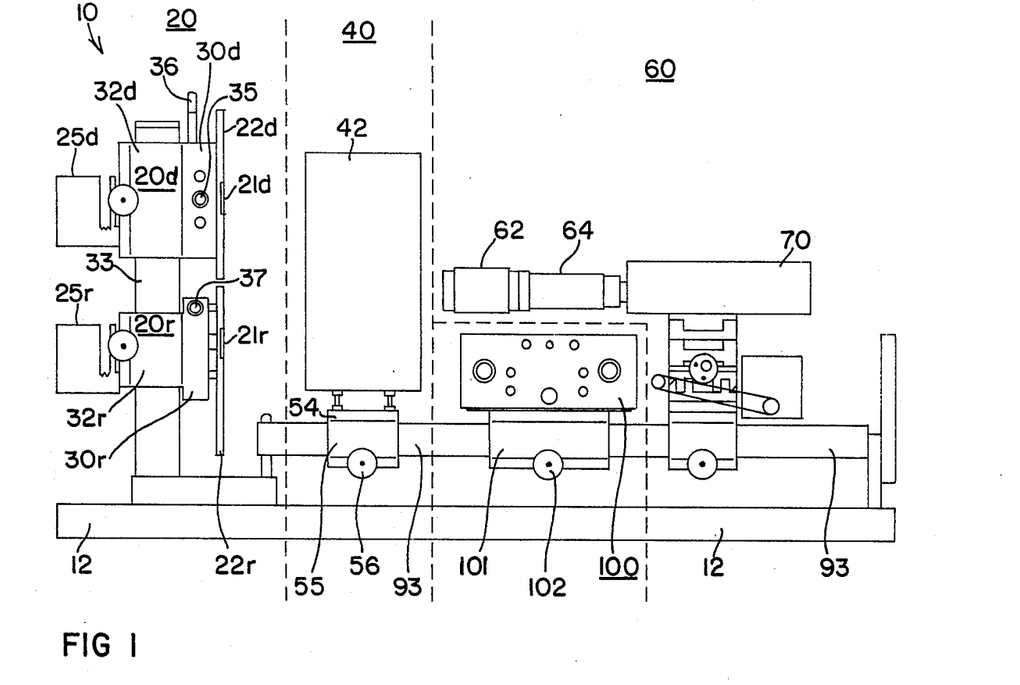
FIG. 1 is a diagrammatic side view of the Video Blink Comparator System according to the present invention.

The video blink comparator system 10 shown in FIG. 1 is delineated by dashed lines into its four component modules, an image presentation module 20, an optical or mirror/beamsplitter module 40, a video camera module 60, and the control module 100. The various modules are moveably mounted on rod and clamp assemblies hereafter described which are in turn mounted on the table top or mounting platform 12.

Figure 2:
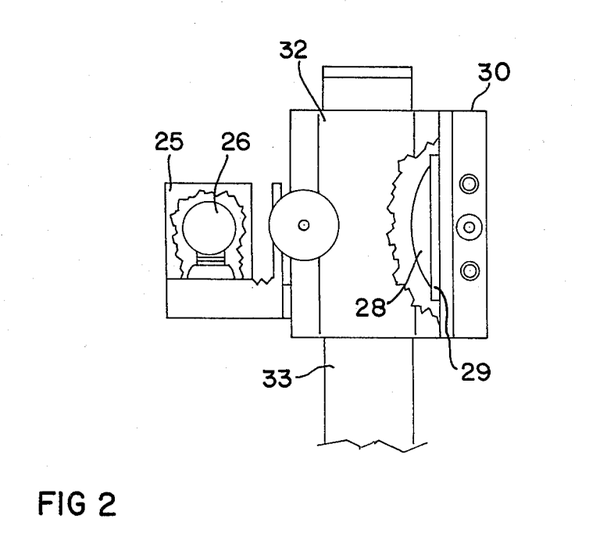
FIG. 2 is a detailed diagrammatic side view partially cutaway of a portion of an image presentation channel of the image presentation module.
Figure 3:
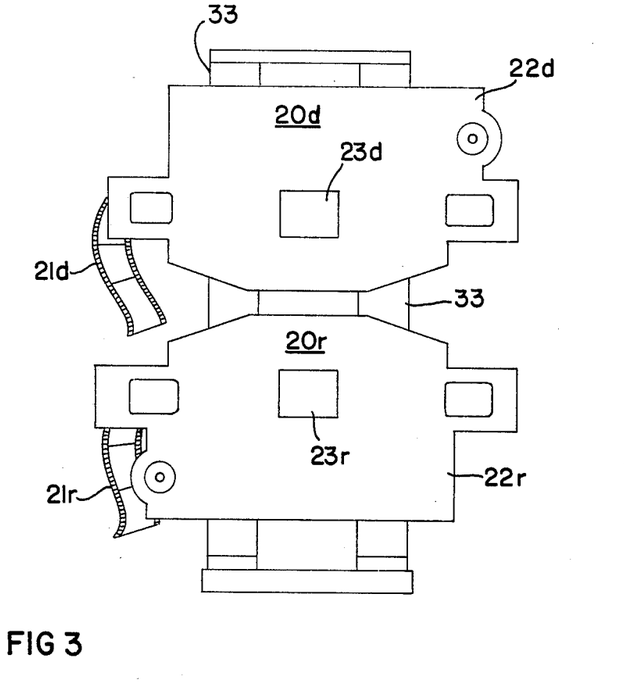
FIG. 3 is a front view of the image presentation module showing the respective slide transparency carriers and respective image presentation channels for the data image and reference image slide transparencies.

Referring to FIGS. 1, 2 and 3, the image presentation module 20 is provided with two channels 20d and 20r for simultaneous presentation of an unknown data image pattern and a known reference image pattern along parallel light paths. The respective image patterns are previously prepared in the form of transparencies. Each channel is similarly constructed except for differences hereafter noted and reference is made to the upper data channel and the lower reference channel by the same reference numerals separately identified on FIGS. 1 and 3 by the letters "d" and "r" respectively.

Each slide transparency 21 is mounted on a slide transparency image carrier or carriage 22 including a window 23 in which the particular slide transparency image of interest is positioned for illumination. The slide transparency carrier may be, for example a Bessler "Negatrans" mounting carriage manufactured by the Bessler Co., N.J., 07932. The slide transparency image carrier 22 is in turn mounted on an independently moveable stage 30 as hereafter described.

The transparency is illuminated by light source 25 such as an American Optical substage "Starlite" microscope illuminator with bulb 26 which is painted white or frosted. Referring particularly to FIG. 2 which applies to both the data and reference channels, the light source 25 is collimated and diffused by the plano-convex diffuser lens or collimating lens 28 oriented as shown and having a focal length, for example of 89 mm.

The light source 25, diffuser lens 28, independently moveable stage 30, and carrier 22 are all aligned and mounted on the clamp 32 of a rod and clamp assembly of the type available from Newport Corporation 18235 Mt. Baldy Circle, Fountain Valley, Calif. 92708 and described at pages 66–67 of the 1980–1981 Newport Corporation Catalog and in particular, the double rod assembly as shown at page 78 of the catalog. The clamp 32 may be adjusted to any height on the vertical rods or posts 33, two of which are used in adjacent parallel relationship to increase the stability of the system. The light source 25, diffuser lens 28, and window 23 of the carrier are aligned between the rods or posts 33 for establishing the light path. The moveable stage 30 is also provided with a central opening aligned with the light path. Diffuser lens 28 is mounted between the posts on balsa wood mounts 29.

In the example of FIG. 1, the moveable stage 30d of the data image channel differs from the stage 30r of the reference data image channel. Both stages are of the type available from Newport Corporation and described at pages 72–78 of the 1980-81 Newport Corporation Catalog. However, stage 30d is a dual axis translational stage of the type shown at page 77–78 of the Catalog while stage 30r is a rotational stage of the type shown at pages 72 and 73 of the Catalog. The dual axis translational stage 30d includes two micrometer adjustment nobs 35 and 36 for precision movement of the stage along to mutually perpendicular axes, in turn orthogonal to the light path. The rotational stage 30r includes a single micrometer adjustment nob 37 for precision rotational movement of the stage around an axis lying along the light path. The transparency in the image carrier mounted on stage 30d and the transparency in the image carrier mounted on stage 30r may therefore be precision aligned by the respective degrees of translational and rotational freedom afforded by the stages when the data image and reference image light paths are superimposed as hereafter described.

Figure 4:
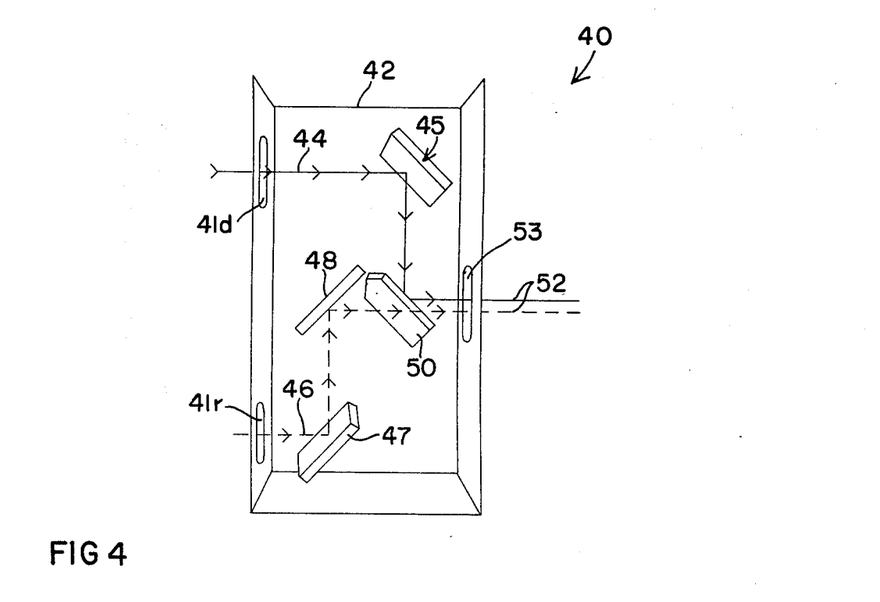
FIG. 4 is a simplified diagrammatic side view of the optical module or mirror/beamsplitter module with side cover removed and with adjusting and mounting brackets not shown.

The two parallel data image and reference image light paths exiting the image presentation module 10 at windows 23d and 23r respectively enter the optical module or mirror/beamsplitter module 40 through openings 41d and 41r formed in the module housing 42 as shown in FIG. 4. The data image light path or beam 44 strikes a mirror 45 silvered at its front surface or first surface and directs the data image light path onto the beamsplitter 50 which is a partially silvered mirror. The reference image light path of beam 46, differentiated from the data image light path by the broken line, encounters a first mirror 47 also silvered at its front or first surface. Mirror 47 directs the reference image light path 46 to the second mirror 48 silvered at its first surface which directs or deflects the reference image light path for transmission through the partially silvered mirror beamsplitter 50. In this manner the data image and reference image light are cast simultaneously on the beamsplitter and the data image light path and reference image light path are superimposed to form the superimposed light path 52 which exits the housing of the optical module 40 through the single opening 54 in housing 42.

The mirrors and beamsplitter are mounted within the housing 42 of the optical module 40 by means of mirror and beamsplitter mounts of the type available from Newport Corporation and described at pages 40–45 of the 1980-81 Catalog of that company. Such mounts permit fine adjustment of the position and angle of the optical components in the module.

The entire optical module 40 is mounted on a rack and pinion rod and clamp mount with clamp 55 spanning the dual rods 93 for translation along the rods by rack and pinion drive under control of nob 56. The rack and pinion rod and clamp mount is of the type described in Newport Corporation 1980-81 Catalog at pages 66 and 78. The housing 42 of optical module is fixed to the platform 54 on clamp 55.

Figure 5:
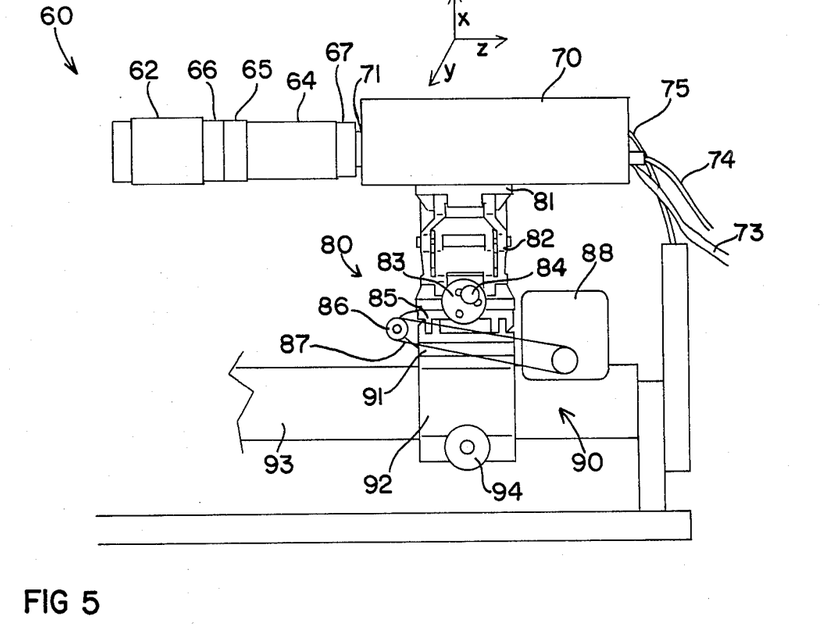
FIG. 5 is a detailed side view of the video camera module showing the lens, extender tube, extender rings and camera mounting system.

The superimposed data image and reference image light path 52 enters the video camera module 60 at the image forming or focusing lens 62, for example a 135 mm f/3.5 Pentax "Takumar" telephoto lens. Lens 62 forms a superimposed data image and reference image at the scanning surface or aperture of video camera 70. The video camera is selected for high sensitivity, that is for low level light detection and low image density discrimination, and may be, for example an RCA TC-1000 Nuvicon video camera. Lens 62 is mounted to the video camera but spaced from the camera a selected distance by the mounting extension tube 64 and one or more coupling rings or extension rings 65 and 66. The extension tube is directly mounted to the scanning aperture 71 of the video camera 70 by C-mount adaptor 67, all as shown in FIG. 5.

The extension tube 64 with one or more extension rings 65 and 66, space the image forming lens 62 from the scanning surface or aperture of the video camera a selected distance according to the selected magnification of the image at the focal plane of the lens. Thus, lens 62 is adjusted to a desired magnification or enlargement and the extension tube length is selected and adjusted along with the rings so that the image scanning surface or aperture of the video camera lies in the focal plane of the lens. In an example hereafter described the superimposed image field enlargement or magnification is selected so that the scanning surface or aperture covers approximately one sixteenth of the image field of the superimposed data and reference images for sequential scanning of 1/16th fractional portions of the superimposed image field.

As used in the specification and claims the reference to the "scanning surface" of the video camera 70 is intended to refer to either a scanning surface or scanning aperture at the front face of the camera, whatever model or type video camera is selected for use in the video blink comparator.

Figure 6:
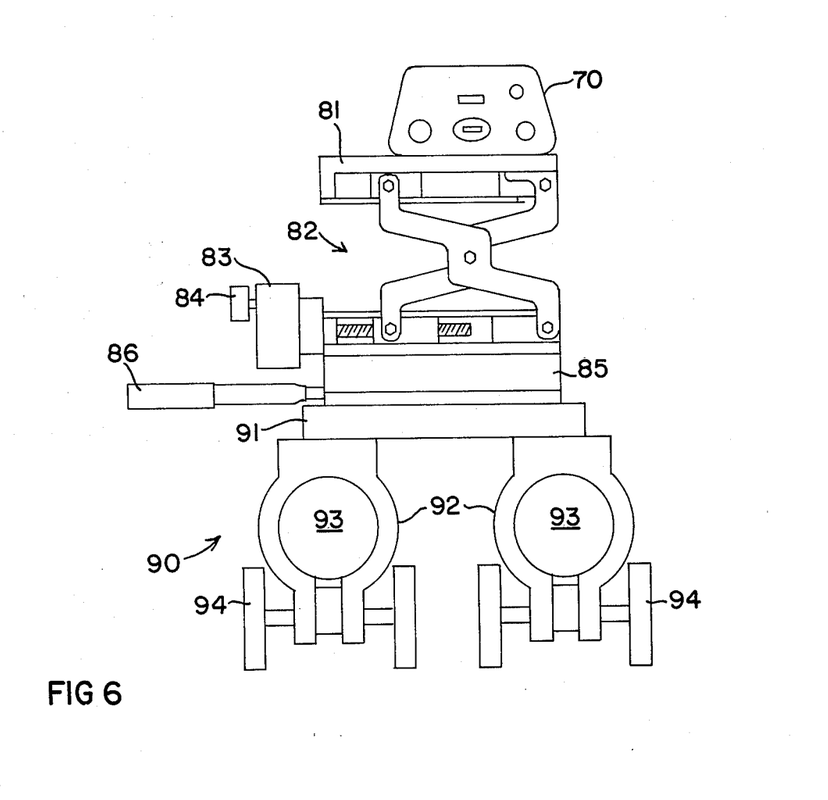
FIG. 6 is a rear view of the video camera module showing further details of the camera mounting and translating arrangement.

The universal mounting system 80 for the video camera 70 is described with reference to FIGS. 5 and 6. The video camera 70 is mounted on the platform 81 of a vertical movement camera jack 82 of the type provided by Klinger Scientific Corporation, 110-20 Jamaica Avenue, Richmond Hill, N.Y. 11418 and described at pages 56 and 57 of the Klinger Scientific Corporation Catalog 409. This Catalog also describes further examples of translational and rotational stages, mirror and optical mounts and brackets, and rod supports of the type referred to in the description above. The large nob 83 of camera jack 82 adjusts the height along the vertical axis of video camera 70 while the small nob 84 locks the height adjustment.

The camera jack 82 is in turn mounted on a single axis translational stage 85 of the type available from either Newport Corporation or Klinger Scientific Corporation and as setforth in the catalogs referred to above. By means of the micrometer adjustment 86 the stage 85 may be precision translated along an axis in the plane of the drawing perpendicular to the vertical movement axis of the jack 82. As a further refinement of the universal mounting system for the video camera module a scanning motor 88 is provided such as a Bodine 25 RPM reversible motor available from Bodine Corporation, Chicago, Ill. By means of belt 87 the scanning motor 88 may drive the micrometer adjustment 86 for precision translation of the video camera 70 in the focal plane of the superimposed data image and reference image. Thus, scanning motor 88 provides automated translation of the scanning surface or aperture of video camera 70 to sequential fractional portions or blocks across the image field of the superimposed data and reference images.

The video camera 70 vertical jack 82 and translational stage 85 are in turn mounted on the platform 91 of a rack and pinion rod and clamp mount 90 of the type illustrated at pages 66 and 78 of the Newport Corporation 1980–81 Catalog. In the mount 90, the clamp 92 spans two rods 93 and moves along the rods by a rack and pinion drive along the horizontal axis in the plane of the paper of FIG. 5. The rack and pinion drive is under the control of control nob 94 and permits motion of the video camera 70 for placement of the scanning surface or aperture in the focal plane of the superimposed data and reference images.

As shown in FIG. 5 the vertical jack 82 permits motion of the video camera in the vertical direction along the x axis. The translational stage 85 permits motion in the horizontal direction along the y axis, and the rack and pinion rod and clamp mount 90 permits motion in the horizontal direction along the z axis. A universal mounting system is thereby provided so that the video camera module can accommodate varying magnification of the superimposed data image and reference image, and sequentially scan the superimposed image field in sequential blocks, sectors or fractional portions.

The video camera 70 includes a power cord 73, a video signal output line 74 derived from scanning the superimposed reference and data image, and an image reversal control line 75 coupled to the control module 100 for reversing the image presentation on the video monitor between positive and negative. Video signal output line 74 is connected to a video monitor, not shown but preferably a high resolution monitor such as an RCA TC 1217 with 70 inch diagonal screen and 800 lines per image, line density. This model is also referred to as the Herback and Rademan R6-509 model.

Figure 7:
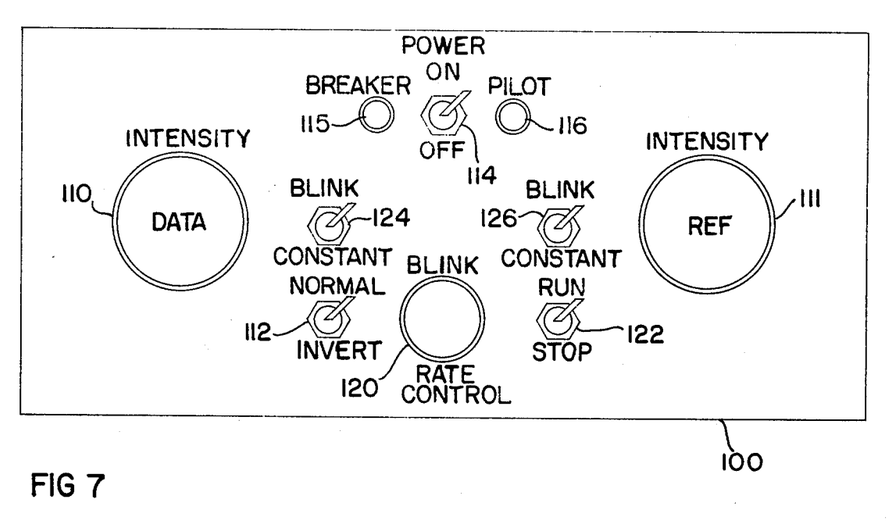
FIG. 7 is a front plan view of the control panel.

Referring to FIGS. 1 and 7 the control module 100 is also mounted on the horizontal support rods 93 by a rack and pinion drive clamp 101 with rack and pinion drive control nob 102. Thus, the optical module 40, video camera module 60 and control module 100 are all mounted for translation and adjustment along rods 93 relative to the image presentation module 20.

The control module 100 permits variation in the parameters of operation of the video blink comparator system for optimizing the analysis and discrimination of patterns as they appear on the video monitor in order to determine whether there is a variance between the data pattern and reference pattern. Furthermore, the various mode controls permit procedures for determining in which of the data image or reference image an anomalous blinking spot or other variant pattern element appears.

In order to optimize presentation of the image and reference data on the video monitor, separate brightness controls 110 and 111 are provided for separate and independent control of the data image light source 25d and the reference image light source 25r respectively. The brightness controls 110 and 111 control separate dimmer circuits hereafter described for adjusting the intensity of illumination of the data image and reference image for optimum balance of the two images on the video monitor. Either light source may also be turned entirely off by the dimmer controls 110 and 111. Image reversal control 112 permits reversal of the superimposed image appearing on the video monitor between positive and negative for best contrast between the superimposed image patterns and background. In other words, the composite image which is the sum of the data image and reference image in time by alternate blinking may be presented as a positive image or a negative image. Both the data image and reference image are the same image mode. Either the postive image mode presentation or negative image mode presentation may be selected according to whichever affords the best contrast between the pattern under investigation and the background. Power on/off switch 114 controls the power supply also hereafter described. Circuit breaker 115 and pilot light 116 are coupled to the power supply circuit.

The blink rate frequency of the respective light sources or illuminators 25d and 25r are simultaneously regulated and varied by the blink rate or frequency control 120 so that the blink rate of the data light source 25d and the reference light source 25r remain the same when both light switches are blinking during the run mode. Thus, whenever both light sources and therefore both image modes are blinking, the frequency is the same although the blink is offset in phase so that while one light source is on the other is off and vice versa. In other words, the data image and reference image are superimposed on the same image field or focal plane alternately and sequentially in time rather than simultaneously. Video scanning and video presentation integrates and sums the two images in time to provide a constant background from the common elements in the data image and reference image. Thus, as used herein with reference to the blink comparison system of the present invention, superimposition of the respective data and reference pattern images during the blinking operation means that the pattern images are superimposed sequentially in time. The sum of the similar portions of the alternating images appears as a constant background to the viewer. Against this continuous background, variant portions blink or flicker at the blink frequency.

By means of the run/stop control 122 blinking can be initiated at both light sources 25d and 25r when the switch 122 is in the run position. With switch 122 in the stop position whichever light source is on at the time the switch 122 is actuated to the stop position remains on while the other remains off for inspection of either the selected data image or reference image. This permits one method for ascertaining in which image a variant blinking spot or element occurs.

Controls 124 and 126 provide separate and independent control for each light source and therefore each image for blinking the respective image at the frequency selected by switch 120 or for maintaining the light source of either the data image or reference image constantly on or constantly off.

In operation of the video blink comparator system the power supply is turned on to permit warmup of the camera, illuminators, and control. The data image and reference image are both illuminated and generally aligned in the image field monitored by the video monitor. The portion viewed on the monitor may be either the entire superimposed image field or a magnified segment or fractional portion of the field. The shared image spots or other elements of the data pattern and reference pattern are generally aligned using the x, y or dual axis translational stage 30d and the rotational stage 30r of the image presentation module 20. Using dimmer controls 110 and 111 the intensity of the light sources or illuminators is adjusted for accommodating and balancing the two superimposed images on the video monitor.

By means of blink frequency control 120 both images are placed on a low frequency blink. Alternatively by means of controls 124 and 126 both the data image and reference image are constantly illuminated. During the slow blink or constant illumination a common shared spot or pattern element of the respective data and reference patterns are intentionally misaligned for example vertically using the vertical y axis of stage 30d. The blackness or density of the pattern spots or elements in juxtaposition next to each other are compared so that the image pattern element densities are the same and further fine adjustment of brightness controls 110 and 111 is used if necessary. Additionally, the reverse image mode permitted by control 112 may be used to balance the image intensity or density on the monitor in either or both the positive or negative image mode to adjust the picture quality. The intentionally misaligned pattern spots or elements are again superimposed and aligned. After the intentionally misaligned spot or pattern elements have been realigned the blink rate is adjusted upward and the superimposed patterns viewed on the video monitor until a blinking pattern spot or element is located. By means of either control 124 or 126 one of the images can be placed in the constant illumination mode to see whether the variant pattern element continues to blink. This is one method for determining in which image the variant or anomalous blinking spot pattern occurs. Lowering the blink rate frequency by control 120 may also be used to facilitate such identification. Determination in which image the variant blinking pattern occurs is accomplished according to another method by adjusting the duty cycle of blinking of one of the superimposed images to greater than 50% while adjusting the duty cycle of blinking of the other image to a duty cycle less than 50%. The images superimposed alternately and sequentially in time are therefore blinking for different dwell periods.

Several other techniques are available for identifying a variant pattern element. Thus, the run/stop control 122 may be placed in the stop mode for ascertaining in which image the blinking element originates. By means of either of the controls 110 or 111 either of the light sources 25d or 25r may be turned entirely off as another mode of identifying and locating the variant spot or pattern element. Thus, the flexibility of the parameter controls afforded by control module 100 permits in the initial instance optimum presentation of the data and reference image information on the video monitor, and secondly, a variety of methods for analyzing, locating and identifying variant spots or other pattern elements flagged by the blinking effect on the video monitor screen readily apparent to the viewer or operator.

Figure 8:
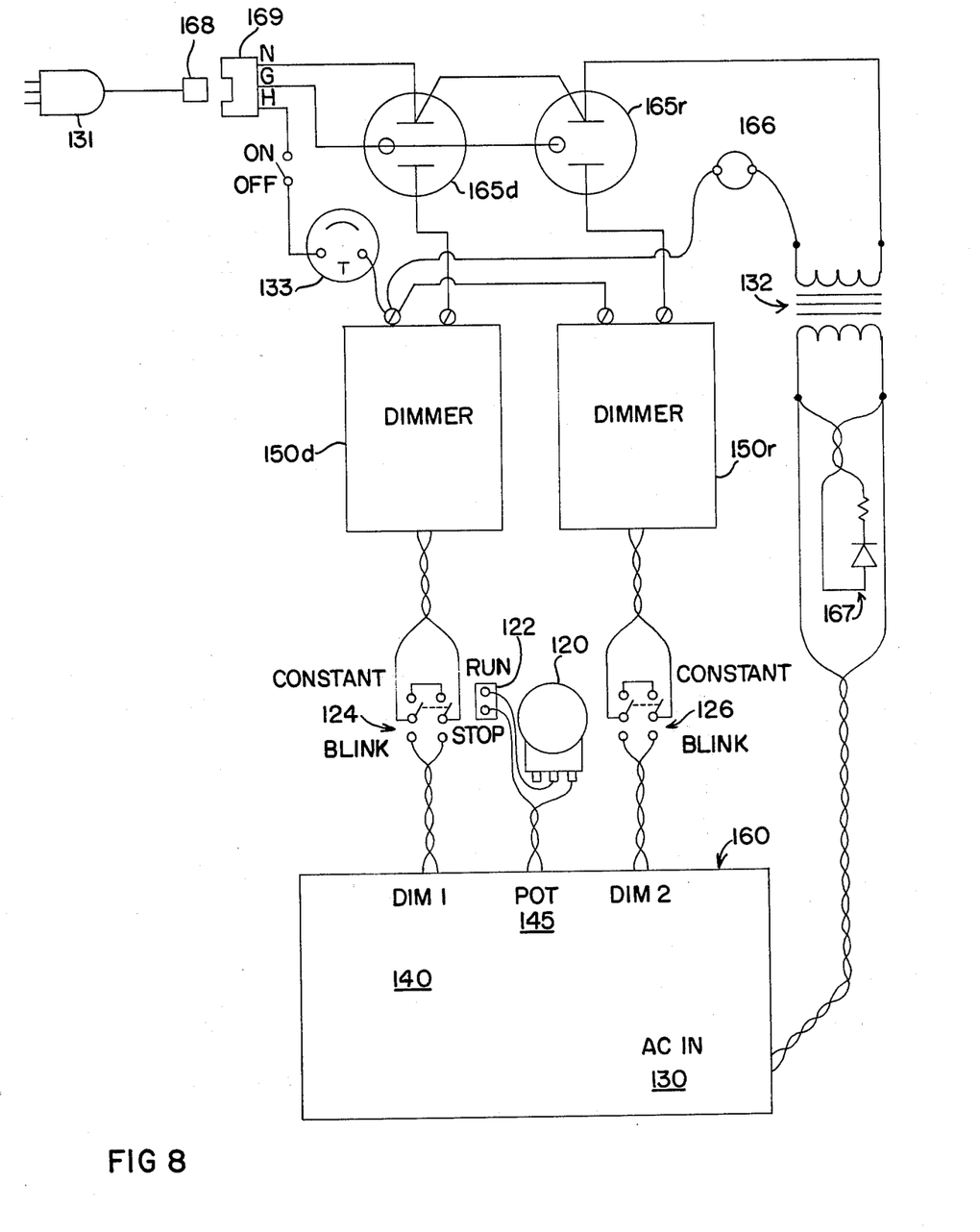
FIG. 8 is a pictorial diagram of the wiring layout for the video blink comparator.
Figure 9:
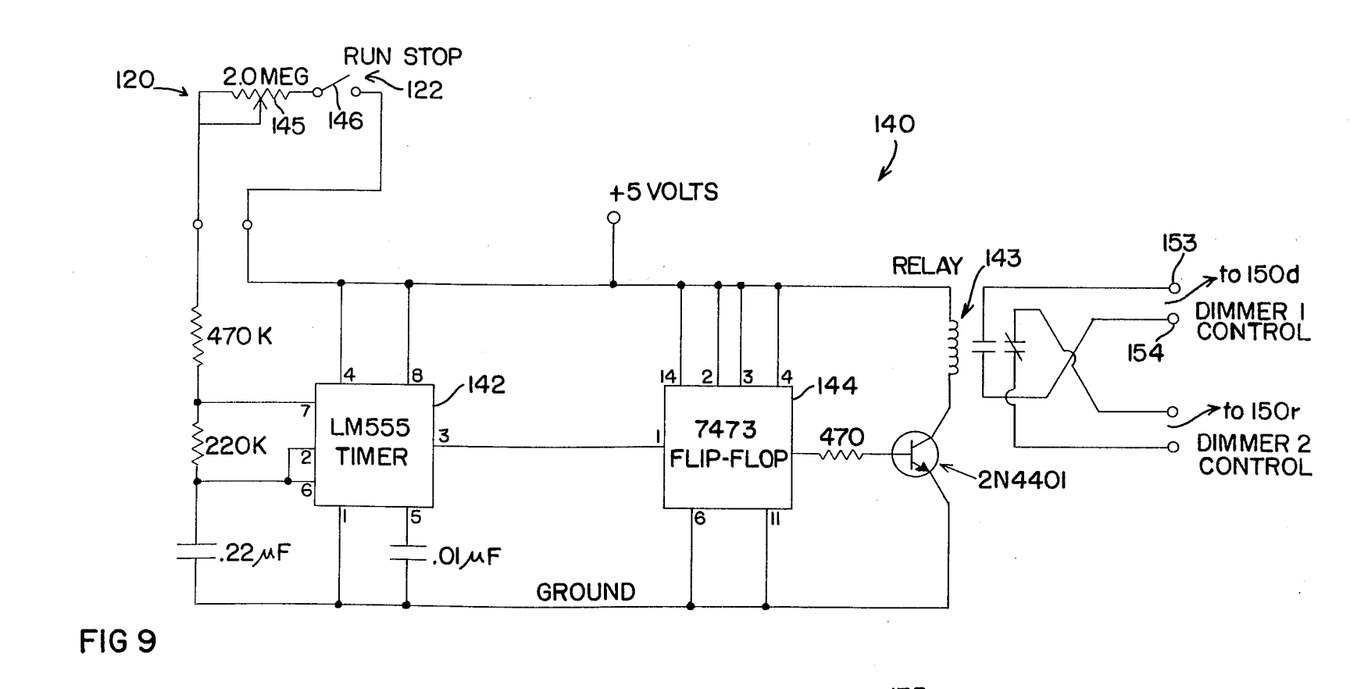
Figure 9A:
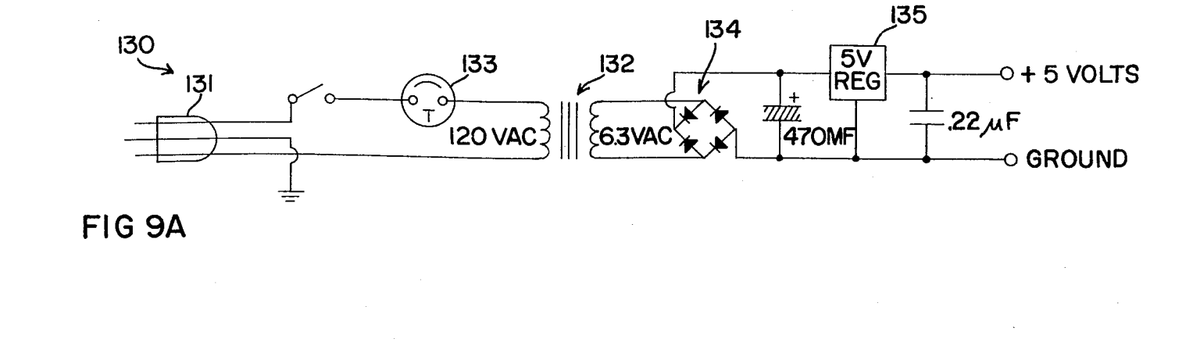
FIGS. 9A and 9B are schematic diagrams respectively of the power supply and dimmer circuits.

The control circuitry and wiring diagrams for the control module 100 are illustrated in FIGS. 8, 9, 9A and 9B. The power supply 130 for the control module is shown in FIG. 9A. Line power through plug 131 is stepped down to approximately 6.3 volts through step down transformer 132 which includes a thermal breaker 133 in the primary circuit. The secondary is coupled through full wave rectifier 134 to the filter circuit and 5 volt regulator 135 from which is derived the 5 volt DC power supply. The voltage regulator 135 may be a Jameco Electronics LM 340T-5 5 V regulator.

The blink control circuit 140 shown in FIG. 9 includes an oscillator 142, for example a Jameson Electronics NE-555 timer connected in an oscillator configuration to deliver a variable frequency square wave signal over the frequency range of 1 to 5 hertz. Because this signal is asymmetric it is fed into flip flop 144, for example a Jameson Electronics 7473 flip flop, which produces a symmetrical square wave output to switch the 5 volt relay coil 143 for coupling the dimmers 150. Relay 143 isolates and controls the dimmers 150 through normally open and normally closed relay contacts.

The blink frequency or rate control 120 consists of a Radio Shack 271-093 2 megohm potentiometer 145 while the run/stop control 122 consists of switch 146. The pin numbers for coupling the LM 555 timer as an oscillator 142 and the pin numbers for coupling the 7473 flip flop 144 are shown in small numerals in the diagram of FIG. 9. Other components are labelled according to the respective values.

Figure 9B:
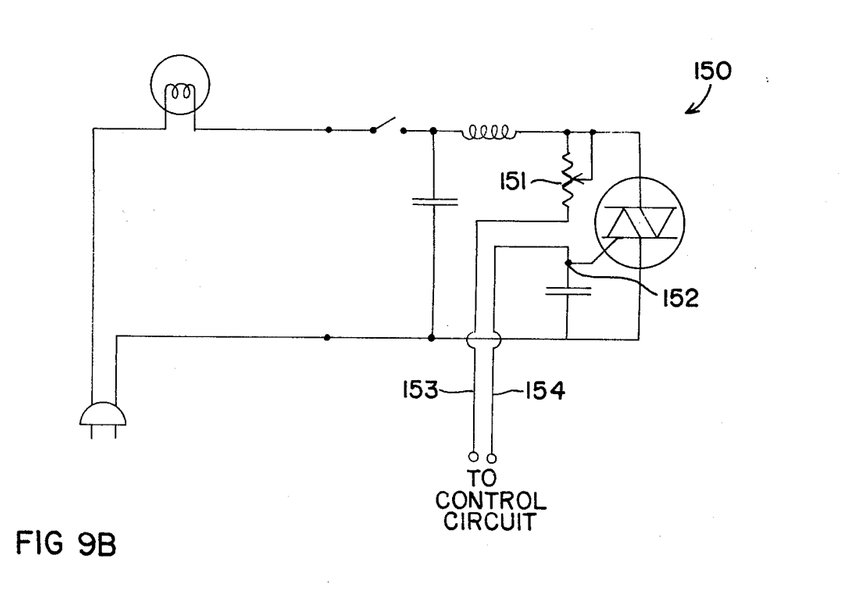

The dimmers 150 incorporated in the control module 100 are each wired as shown in FIG. 9B. Each dimmer is a standard General Electric #DIU 61 Full Range Dimmer modified as shown in FIG. 9B. That is, the line between the potentiometer 151 and terminal 152 of the triac gate circuit is cut, with leads 153 and 154 spliced in for connection to the dimmer control relay terminals correspondingly numbered on FIG. 9. Thus, the modification of the dimmer permits control of the dimmer 150 by the relay 143 in the blink control circuitry of FIG. 9. Only low currents are switched by the relay to extend the life of the relay contacts. Any solid state dimmer may be used similarly modified. A second dimmer is similarly wired to the other dimmer control terminals of FIG. 9. Each dimmer is controlled respectively by a relay 143 for "blinking", and by potentiometers 151 for intensity. The controls 110 and 111 which appear on the control module panel of FIG. 7 vary the potentiometers 151 of the respective dimmers.

An overall wiring layout for the control circuit elements of the video blink comparator is illustrated in FIG. 8 where the circuit 140 of FIG. 9 and part of the power supply of FIG. 9A are incorporated into a circuit board 160. The dimmer control output terminals from the blink control circuit 140 are connected respectively to dimmers 150 here designated 150d and 150r to indicate respective control of the data image light source 25d and reference image light source 25r which are plugged in to the respective blink control outputs 165d and 165r shown as plug receptacles in the wiring diagram of FIG. 8. This coupling is made through the respective constant/blink mode switches 124 and 126 respectively. The blink rate control switch 120 controlling potentiometer 145 and the run/stop control switch 122 identified with switch 146 of FIG. 9 are also connected to the circuit board 160 in the manner of the circuit of FIG. 9. The step down transformer is identified at 132 with the primary coupled to the line power through plug 131. The thermal breaker 133 and a 2 amp circuit breaker 166 are also included in the primary circuit. Light emitting diode 167 in the secondary circuit provides a power-on indication. As shown, the line plug 131 is also detachable from the control circuitry by plug and socket 168 and 169 respectively.

Figure 10:
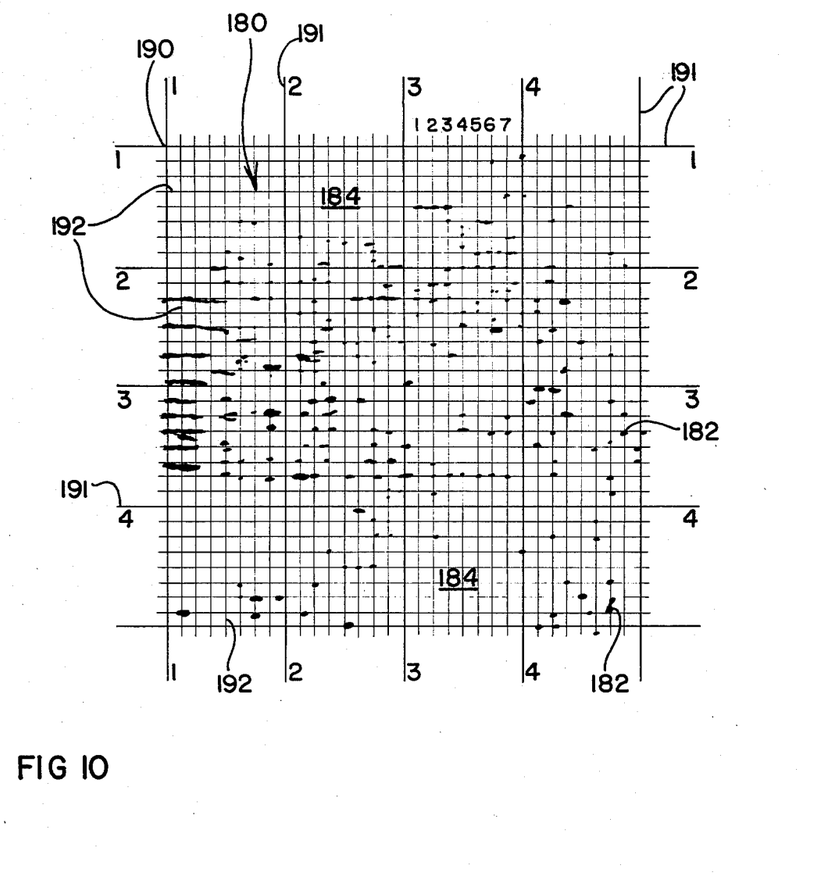
FIG. 10 is a representation of a spot pattern image to be analyzed by the video blink comparator system and method of the present invention showing a superimposed reticle grid pattern for reference during segmented or fractional block scanning of the image field.

FIG. 10 represents a two dimensional electrophoretogram of a protein preparation. Such two dimensional electrophoresis provides a two dimensional distribution of the constituent proteins in the form of a spot pattern suitable for analysis by the video blink comparator of the present invention. The two dimensional array of spots or pattern elements was developed by expanding the different protein molecules of the serum or preparation along a first dimension or axis by the method of isofocusing along a pH gradient. The one dimensional line spectrum is then expanded into a two dimensional array by electrophoresis in which the various proteins are distributed as spots or elements 182 in the two dimensional array or pattern 180.

The electrophoresis is generally carried out in a gel matrix of for example acrylamide, polyacrylamide, agarose or other suitable slab gel. The proteins form a spectrum generally according to molecular weight. The two dimensional electrophoresis thereby provides a protein pattern fingerprint. In this manner an unknown preparation can be compared with a known preparation by the video blink comparator method and apparatus of the present invention for analysis of the protein constituents of the unknown preparation. A transparency is prepared of the distribution for each of the known or unknown preparations so that the two dimensional electrophoretic pattern may be introduced into the image carriers of the video blink comparator as heretofore described.

Superimposed over the two dimensional electrophoretic pattern of protein spots or blobs of FIG. 10 is a grid 190 divided into 16 blocks or fractional portions 184 by major lines 191. Such a grid of blocks provides convenient reference for sequential scanning of fractional portions or blocks of the two dimensional pattern after magnification or enlargement by lens 62. The grid also includes a set of minor lines 192 which divides each of the blocks or fractional portions into further subdivisions of eight along each axis. The fine lines 192 provide convenient reference for detailed measurements of distance and spacing of the spots and for correlation of spots between a known and unknown pattern.

Such a reference grid superimposed over the entire field of the superimposed data and reference images or known and unknown pattern images can be provided by a suitably incribed reticle at the image forming lens 62 in the video camera module. The data and reference images or known and unknown pattern images are thereby superimposed with the grid pattern image at the focal plane of lens 62 and at the scanning surface or aperture of the video camera 70.

Figure 11:
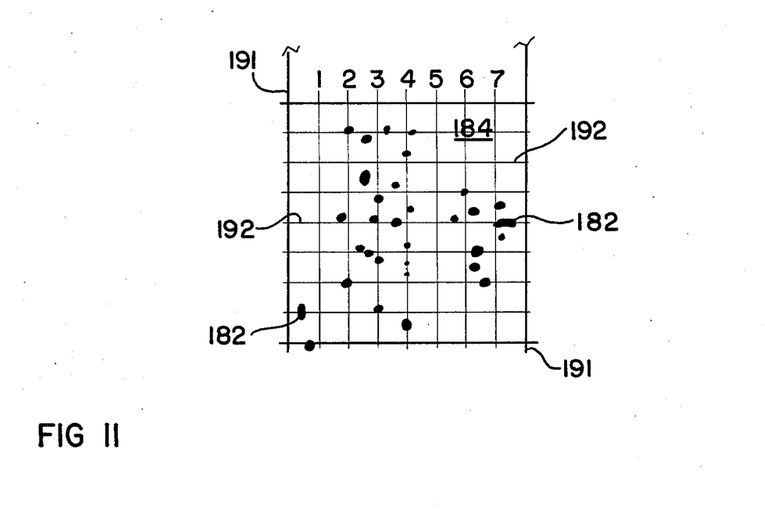
FIG. 11 is a diagrammatic representation of an enlarged portion of the image field of FIG. 10 constituting a fractional portion, segment, sector or block for sequential scanning by the video camera.

By appropriate enlargement the scanning area of the television camera can be made substantially commensurate with one of the fractional portions or blocks 184 of the pattern. Such a block enlarged over the scanning area or aperture of the video camera is shown in FIG. 11. Such a block 184 is framed by the major lines 191 and is further divided by the fine lines 192 for detailed reference to particular spots 182 and measurement of spacing and distances in the overall pattern 180. Suitable indicia 194 may be provided for both the major lines and fine lines of the grid pattern 190.

With the magnification or enlargement of the original superimposed pattern at a desired fractional portion or block level as shown in FIG. 11, sequential scanning of each fractional portion or block 84 can be effected by appropriate operation of the universal mounting system 80 of the video camera. In particular the translational stage 85 is used for sequential motion of the camera to each successive block 184 across a row of four blocks. This may be automated with scanning motor 88. The vertical jack 82 is used for movement of the camera to another row for sequential scanning of each block in the next row.

A feature and advantage of this arrangement is that non-linear distortion which varies between the known and unknown patterns can be compensated locally by realignment of the common spots within each block and without regard to misalignment of spots caused by the non-linear distortion in other blocks of the overall array. The procedure for alignment described above is followed in each block. Thus, by "compensation" is meant local alignment of fractional portions of the compared images and not transformation of the coordinate system of either of the images.

Such stepwise and sequential block scanning of fractional portions of the superimposed image may be automated by provision of microprocessor controlled motors, servomechanisms, or programmed drives, in order to provide the sequenced blink comparison by sector.

While a particular application of the present invention is described with reference with FIGS. 10 & 11 it is apparent that the invention has broad application where simple and complex patterns of elements are to be compared and analyzed and the invention is intended to cover all applications, variations, modifications and equivalents within the scope of the appended claims.

Moreover, the video signal from the video blink comparator video camera may alternatively or simultaneous with real time viewing on the video monitor, be input to an image analyzer or image data processor for digital computer analysis of the digitized image data using appropriate software to recognize blink data according to digital computer methods. Such image analyzers and image data processors are of the type set forth in the U.S. patents cited in the discussion of the Background of the Invention. An advantage of the video signal format of the present invention is that the video blink data may also be recorded for sub sequent use.

We claim:

1. A video blink comparator comprising:
   data image presentation means including a first image carrier, first light source, and first lens means for establishing a data image light path;
   reference image presentation means including a second image carrier, second light source, and second lens means for establishing a reference image light path;
   optical means for superimposing said data image light path and reference image light path;
   image forming lens means positioned in the superimposed data image and reference image light paths for forming a superimposed data image and reference image in a common focal plane spaced from said image forming lens means;
   said data image and reference image being the same positive or negative image mode;
   at least one of said image carriers operatively mounted for translation and at least one of said image carriers operatively mounted for rotation for accurate alignment and superimposition of the respective data image and reference image formed by the image forming lens means in said focal plane;
   video camera means and camera mounting means for translating said camera along three dimensions or axes for positioning the video camera scanning surface in said focal plane for scanning of at least a selected portion of the image field of the superimposed data image and reference image and forming a video signal of said superimposed images;

extension means for coupling said image forming lens means and video camera means at desired spaced apart positions relative to each other;

blink control means for independently controlling said respective first and the second light sources for operation of said light sources at the same selected blink frequencies, but offset in phase so that when one light source is on the other is off whereby the data image and reference image are operatively superimposed in the same image field of the focal plane alternately and sequentially in time rather than simultaneously;

and video presentation means for integrating and summing the superimposed data image and reference image in time to provide a constant background from the common elements in the data image and reference image with blinking of variant portions of the data image and reference image against the constant background at said selected blink frequency;

said video blink comparator thereby affording direct viewing of the alternately and sequentially superimposed data image and reference image for direct recognition by a viewer or operator on the video presentation means of variant portions blinking on the constant background.

2. The video blink comparator of claim 1 wherein said optical means comprises a beamsplitter for superimposing said data image light path and reference image light path along a coincident light path.

3. The video blink comparator of claim 1 wherein one of said image carriers is mounted for translation along two mutually orthogonal axes in turn perpendicular to the respective image light path, and wherein the other of said image carriers is mounted for rotation about a third axis lying along the respective image light path.

4. The video blink comparator of claim 1 wherein said image forming lens means comprises image enlarging means and wherein said image enlarging means, extension means and video camera means position are selected so that only a fractional portion of the superimposed data image and reference image falls on the video camera scanning surface for scanning whereby said video camera scans a fractional portion or sector of the image field of said superimposed images, said video camera mounted for sequential scanning of different portions or sectors of the superimposed images.

5. The video blink comparator of claim 4 wherein said image enlarging means and extension means are selected for scanning by the video camera means of fractional portions or sectors in the range of the whole image field to 1/16 of the image field of the superimposed data and reference images.

6. The video blink comparator of claim 1 further comprising video viewing means operatively coupled to said video camera means for real time viewing of the superimposed data image and reference image.

7. The video blink comparator of claim 6 further comprising positive/negative image reversal control means operatively coupled to said video camera means for viewing the superimposed data and reference images in either positive or negative mode.

8. The video blink comparator of claim 1 further comprising scan motor means operatively coupled to said video camera means for translating said camera means in the focal plane of the image forming lens means, and further comprising scan motor control means for controlling the scan motor means to effect sequential positioning of said video camera means at different locations in said focal plane for piecewise scanning of the image field of the superimposed data and reference images in sequential segments, sectors, or blocks.

9. The video blink comparator of claim 1 wherein said blink control means further comprises image density control means operatively coupled for independently varying the intensity of the respective first and second light sources.

10. The video blink comparator of claim 1 wherein said blink control means further comprises:

blink and constant mode control means operatively coupled for causing one of the light sources to blink on and off at a desired frequency while maintaining the other light source continuously on when the blink and constant mode control is actuated to facilitate determination in which image a blinking variant portion lies;

run mode control means operatively coupled for alternately blinking both said first and second light sources at the same frequency but offset in phase so that one light source is on when the other is off when the run mode control is actuated;

blink rate control means operatively coupled for varying the same frequency of blinking of said first and second light sources;

and stop mode control means operatively coupled for stopping whichever light source is one when the stop mode control means is actuated during the run mode.

11. The video blink comparator of claim 1 wherein said optical means comprises first deflection means in the data image light path, second deflection means in the reference image light path, said first and second deflection means comprising first surface reflecting mirrors, and beamsplitter means, said first and second deflection means operatively arranged for directing the data image light path and reference image light path onto said beamsplitter for superimposing said data and reference image light paths.

12. The video blink comparator of claim 1 comprising video recording means operatively coupled to said video camera means for recording the video signal of the superimposed data image and reference image.

13. The video blink comparator of claim 1 further comprising grid reticle means positioned in the superimposed data image and reference image light path for superimposing in the common focal plane a coordinate grid pattern across substantially the entire image field of the superimposed data image and reference image.

14. The video blink comparator of claim 13 further comprising scan motor means operatively coupled to said video camera means for translating said video camera means in the focal plane of the image forming lens means, and further comprising scan motor control means for sequentially positioning said video camera means at different locations in said focal plane for piecewise and sequential scanning of different fractional portions of the image field of the superimposed data image and reference image in segments, sectors or blocks, said scan motor control means constructed and arranged for sequential positioning of the video camera in the respective segments, sectors or blocks by reference to the coordinates of said grid pattern.

15. The video blink comparator of claim 14 wherein said scan motor control means comprises servo mechanism means responsive to the coordinates of said grid pattern.

16. The video blink comparator of claim 14 wherein said scan motor control means comprises computer control means responsive to the coordinates of said grid pattern.

17. A video blink comparator comprising:
an image presentation module comprising first and second light sources, first and second lens means and first and second image carriers for establishing first and second image light paths, at least one of said image carriers operatively mounted in the image presentation module for translation in directions orthogonal to the respective image light path, at least one of said image carriers also mounted for rotation about an axis lying along the respective image light path;
a video camera module comprising image forming lens means operatively mounted in the coincident superimposed image light path for forming superimposed first and second images in a common focal plane spaced from said image forming lens means, video camera means operatively mounted in the superimposed image light path for translation in three dimensions or axes whereby said camera may be moved to the focal plane of said image forming lens means for scanning the superimposed first and second images and generating a corresponding video signal and whereby said video camera means may be translated in the focal plane for sequentially scanning different sectors, segments of blocks of the image field of the superimposed first and second images, and extension means for coupling the image forming lens means to said video camera at a desired spacing;
a control module comprising blink control means operatively coupled to the first and second light sources for independently blinking said light sources on and off in alternating sequence at the same selected frequency but offset in phase so that when one light source is on the other is off, dimmer control means for controlling the intensity of illumination of said respective first and second light sources, and blink rate control means for varying the same frequency of blinking of said first and second light sources whereby the first and second images are operatively superimposed in said focal plane alternately and sequentially in time rather than simultaneously;
and video presentation means for integrating and summing the superimposed first and second images in time to provide a constant background from the common elements in the first and second images with blinking of variant portions of the first and second images against the constant background at said selected frequency;
said video blink comparator thereby affording direct viewing of the alternately and sequentially superimposed data image and reference image for direct recognition by a viewer or operator on the video presentation means of variant portions blinking on the constant background.

18. The video blink comparator of claim 17 wherein said control module further comprises video camera control means for reversing the video image formed by said camera between positive and negative.

19. The video blink comparator as set forth in claim 17 wherein said video camera module comprises scan motor means operatively coupled to said video camera for translating said camera along two axes in the focal plane of the image forming lens means and wherein said control module comprises scan motor control means for controlling the scan motor means to effect piecewise scanning of the image field of the superimposed first and second images in sequential segments, sectors or blocks.

20. The video blink comparator of claim 19 wherein said scan motor control means comprises computer means.

21. The video blink comparator of claim 19 wherein said scan motor control means comprises servomechanism means.

22. The video blink comparator of claim 19 wherein said image forming lens means comprises means for varying the magnification or enlargement of said superimposed first and second images formed in a common focal plane thereby varying the fractional portion of the image field of said superimposed first and second images scanned by the video camera means.

23. The video blink comparator of claim 19 wherein said extension means is variable for variably adjusting the spacing between said image forming lens means and video camera means thereby varying the fractional portion of the image field of the superimposed first and second images scanned by said video camera means.

24. The video blink comparator of claim 17 wherein said optical means comprises first deflection means in the first image light path, second deflection means in the second image light path, said first and second deflection means comprising first surface reflecting mirrors, and beamsplitter means, said first and second deflection means operatively arranged for directing the first image light path and second image light path onto said beamsplitter for superimposing said first and second image light paths.

25. The video blink comparator of claim 17 wherein said control module further comprises:
blink and constant mode control means operatively coupled for causing one of the light sources to blink on and off at a desired frequency while maintaining the other light source continuously on when the blink and constant mode control is actuated to facilitate determination in which image a blinking variant portion lies;
run mode control means operatively coupled for blinking both said first and second light sources at the same frequency but out of phase so that one light source is on when the other is off when the run mode control is actuated;
and stop control means operatively coupled for stopping whichever light source is on when the stop mode control means is actuated during the run mode.

26. The video blink comparator of claim 17 wherein said first and second lens means comprise collimating lenses.

27. The video blink comparator of claim 19 further comprising grid reticle means positioned in the superimposed first image and second image light path for superimposing in the common focal plane a coordinate grid pattern across substantially the entire image field of the superimposed data image and reference image.

28. The video blink comparator of claim 27 wherein said scan motor control means is constructed and arranged for sequential positioning of the video camera in the respective segments, sectors or blocks by reference to the coordinates of said grid pattern.

29. The video blink comparator of claim 28 wherein said scan motor control means comprises servomechanism means responsive to the coordinates of said grid pattern.

30. The video blink comparator of claim 28 wherein said scan motor control means comprises computer control means responsive to the coordinates of said grid pattern.

31. A method for comparing a data pattern with a reference pattern comprising:
   illuminating and projecting an image of the data pattern;
   illuminating and projecting an image of the reference pattern;
   superimposing the respective data image and reference image;
   focusing said superimposed images in a common focal plane;
   aligning said respective images by moving either of said data image or reference image for alignment of at least a fractional portion or local sector of the image field of the superimposed images;
   video scanning in said focal plane at least a fractional portion or local sector of the image field of the focused and aligned superimposed data image and reference image and forming a video signal of said superimposed images;
   alternately blinking on and off the respective data image and reference image at the same selected frequency and with complementary but out of phase duty cycles so that one image is on when the other is off thereby operatively superimposing the data image and reference image in said common focal plane alternately and sequentially in time rather than simultaneously;
   and integrating and summing the superimposed data image and reference image in time by forming a video picture from said video signal thereby providing a constant background from substantially identical common elements in the data image and reference image with blinking of variant portions of the data image and reference image against the constant background at said selected frequency;
   and directly viewing the alternately and sequentially superimposed, integrated and summed in time data image and reference image for direct recognition in the video picture by the viewer or operator of variant portions blinking on the constant background.

32. The method of claim 31 comprising the steps of:
   focusing and enlarging said superimposed images in a common focal plane;
   video scanning a fractional portion or local sector only of the image field of the focused and enlarged superimposed data image and reference image;
   and wherein said step of aligning comprises viewing only said fractional portion or local sector of the superimposed image field on a video picture derived from the video signal and moving either of the data image or reference image for local matching and aligning of only said fractional portion or local sector thereby compensating for any non-linear distortion across said images relative to each other.

33. The method of claim 32 wherein said steps of illuminating and projecting images of the data pattern and reference pattern comprise forming transparencies of the respective data pattern and reference pattern, moveably mounting and holding said transparencies at spaced apart locations, and projecting light from respective first and second light sources through said transparencies, and wherein the step of aligning the superimposed data image and reference image comprises moving either of said transparencies.

34. The method of claim 33 wherein the step of blinking on and off the data image and reference image comprises alternately blinking said first and second light sources on and off out of phase relative to each other so that one is on when the other is off and vice versa.

35. The method of claim 31 further comprising the step of varying the frequency and dwell of said blinking.

36. The method of claim 32 wherein the step of video scanning comprises scanning the image field of the superimposed images in said focal plane in fractional portions or local sectors of no less than one-sixteenth the whole image field.

37. The method of claim 31 further comprising the step of independently varying the intensity of illumination of said data image or reference image.

38. The method of claim 31 further comprising the step of blinking one of said images and constantly illuminating the other image.

39. The method of claim 31 further comprising the step of maintaining one image continuously on and the other image continuously off to establish in which image a variant portion is located.

40. The method of claim 31 further comprising the steps of alternately blinking both said superimposed data image and reference image and then stopping the blinking of a selected image at any particular moment and maintaining constant illumination of said selected image while the other image continues blinking to facilitate determination in which image a blinking variant portion lies.

41. The method of claim 31 further comprising the step of reversing the video picture from positive to negative and vice versa.

42. The method of claim 31 further comprising the step of sequentially scanning different fractional portions or local sectors of the image field of the superimposed data image and reference image until substantially the entire image field has been scanned.

43. The method of claim 33 wherein the step of aligning the superimposed data image and reference image comprises translating one of said images in either of two dimensions or axes perpendicular to the respective projecting path, and rotating the other image about the axis of its respective projecting path.

44. The method of claim 31 further comprising the step of superimposing a coordinate grid pattern across substantially the entire image field of the superimposed data image and reference image.

45. The method of claim 44 further comprising the step of sequentially scanning different fractional portions or local sectors of the image field of the superimposed data image and reference image by reference to the coordinates of said grid pattern.

46. The method of claim 44 wherein the step of superimposing a grid comprises interposing a grid reticle in the path of the superimposed data image and reference image.

47. The method of claim 44 further comprising the step of focusing said grid pattern in the common focal plane.

48. The method of claim 45 comprising the step of measuring distances across the image field of the superimposed data image and reference image by reference to coordinates on said grid pattern.

49. The method of claim 44 further comprising the step of maintaining the grid pattern stationary relative to the superimposed data image and reference image.

50. A method for comparing a first element pattern with a second element pattern comprising:
illuminating and projecting an image of the first element pattern;
illuminating and projecting an image of the second element pattern;
superimposing the respective first image and second image;
focusing said superimposed images in a common focal plane;
video scanning at least a fractional portion or local sector of the image field of the superimposed images in said focal plane and forming a real time video picture of said local sector;
blinking said respective first image and second image on and off at a relatively low frequency with complementary duty cycles out of phase so that one of the images is on when the other is off and vice versa thereby operatively superimposing the images in said common focal plane alternately and sequentially in time rather than simultaneously;
selecting one or more corresponding representative elements of the first image and second image, offsetting said corresponding elements of the first image and second image relative to each other for adjacent visual comparison by moving either of the first image and second image, visually comparing said adjacent corresponding elements and varying the illumination of either said first image and second image until the adjacent corresponding elements are substantially equal in intensity or density;
aligning the corresponding elements of said first element pattern and second element pattern in said local sector by moving either of said first image and second image;
relatively increasing the frequency of blink rate to a higher selected frequency;
integrating and summing the superimposed first and second images in time by forming said video picture thereby providing a constant background from substantially identical common elements in the first and second images with blinking of variant portions of the first and second images against the constant background at said selected frequency;
locating a blinking element on the video picture;
identifying whether the blinking element is on the first element pattern or second element pattern;
and video scanning another fractional portion or local sector of the image field of the superimposed images.

51. The method of claim 50 wherein said step of identifying whether the blinking element is on the first element pattern or second element pattern comprises constantly illuminating one of the images while blinking the other image on and off.

52. The method of claim 50 wherein said identifying step comprises turning off the illumination of one of the images while constantly illuminating the other.

53. The method of claim 50 wherein said identifying step comprises turning off the illumination of one of the images while blinking the other image on and off.

54. The method of claim 50 further comprising turning down the blink rate or frequency to verify in which image the blinking spot occurs.

55. The method of claim 50 further comprising the step of reversing the image mode of the video picture between positive and negative.

56. The method of claim 50 wherein said elements comprise spots.

57. The method of claim 50 wherein said elements comprise linear elements.

58. The method of claim 50 wherein said elements comprise integrated circuit component elements.

59. The method of claim 50 wherein said elements comprise non-linear elements.

60. The method of claim 50 wherein said elements comprise topographic or cartographic features.

61. The method of claim 50 comprising adjusting the duty cycle of blinking of one of the superimposed images to greater than 50% while adjusting the duty cycle of blinking of the other image to a duty cycle less than 50% so that the superimposed images are blinking on for different periods and so that while one of the superimposed images is on the other image is off and vice versa.

62. The method of claim 61 wherein the identifying step comprises recognizing the duty cycle of the blink of the variant spot thereby recognizing whether it is in the first image or second image.

63. The method of claim 50 comprising the steps of video scanning at least a fractional portion or local sector of said image field of the superimposed images, generating a corresponding video signal, and recording said video signal.

64. A video blink comparator for comparing a first pattern with a second pattern using a first image and second image formed from said respective patterns comprising:
projection means for projecting and superimposing said first image and second image;
lens means for focusing said superimposed images in a common focal plane;
video camera means for scanning at least a portion of said superimposed images in said focal plane and forming a corresponding video signal;
blink control means for blinking said respective first image and second image alternately on and off at the same selected frequency and out of phase so that when one image is on the other is off whereby the first and second images are operatively superimposed in said common focal plane alternately and sequentially in time rather than simultaneously;
and video presentation means for integrating and summing the superimposed images in time in a video picture to provide a constant background from the common elements in the first and second images with blinking of variant portions of the first and second images against the constant background at said selected frequency;
said video blink comparator thereby affording direct viewing of the alternately and sequentially superimposed integrated and summed in time first and second images for direct recognition by a viewer or operator on the video picture of variant portions blinking on the constant background.

* * * * *